United States Patent [19]
Kolte et al.

[11] Patent Number: 6,058,405
[45] Date of Patent: May 2, 2000

[54] SIMD COMPUTATION OF RANK BASED FILTERS FOR M×N GRIDS

[75] Inventors: Priyadarshan Kolte; Roger Smith, both of Austin, Tex.

[73] Assignee: Motorola Inc., Austin, Tex.

[21] Appl. No.: 08/965,686

[22] Filed: Nov. 6, 1997

[51] Int. Cl.[7] .................................................. G06F 17/10
[52] U.S. Cl. ............................ 708/304; 382/262; 707/7
[58] Field of Search ...................... 364/724.014, 715.013; 382/262

[56] References Cited

U.S. PATENT DOCUMENTS

| | | | |
|---|---|---|---|
| 4,441,165 | 4/1984 | Coleman et al. | 364/715.013 |
| 4,513,440 | 4/1985 | Delman | 382/30 |
| 4,672,567 | 6/1987 | Kelly et al. | 364/572 |
| 4,682,230 | 7/1987 | Periman et al. | 358/167 |
| 4,736,439 | 4/1988 | May | 382/54 |
| 4,928,258 | 5/1990 | May | 364/724.17 |
| 5,144,568 | 9/1992 | Glover | 364/715.01 |
| 5,408,675 | 4/1995 | Florentino et al. | 364/715.013 |
| 5,532,948 | 7/1996 | Kohno et al. | 364/715.06 |
| 5,596,659 | 1/1997 | Nomile et al. | 382/253 |
| 5,712,807 | 1/1998 | Bangham | 382/262 |
| 5,798,846 | 8/1998 | Tretter | 382/262 |

OTHER PUBLICATIONS

Donald E. Knuth, "The Art of Computer Programming", vol. 3 Sorting and Searching, 1973 by Addison Wesley Pub. Co., pp. 220–235.

Alan W. Paeth, "Graphics Gems", by Academic Press, Inc. 1990, pp. 171–175, and "Median Finding on a 3×3 Grid", pp. 711–712.

*Primary Examiner*—David H. Malzahn
*Attorney, Agent, or Firm*—Bruce E. Hayden

[57] ABSTRACT

One way of filtering graphics images to remove pixel dropout and shot noise while preserving overall image quality is to use non-linear filters based on rank order of an M×N grid of pixel values surrounding a pixel to be filtered. This rank order filter method for M×N grids first sorts columns, then sorts rows, and finally sorts diagonals to obtain either just a median filter value, a rank-based filter value, or a complete sorted order of the M×N grid. All of the sort operations are control-flow-free allowing implementation on SIMD processors processing multiple overlapping M×N grids in parallel. Advantage is taken of columns and rows that are shared among the horizontally and vertically overlapping M×N grids in the digital image to reduce the total number of sort operations for the image.

34 Claims, 9 Drawing Sheets

SIMD COMPUTATION OF RANK BASED FILTERS FOR M× N GRIDS

CROSS REFERENCE TO RELATED APPLICATION

This application is related to our copending patent application entitled "SIMD COMPUTATION OF 3×3 GRID RANK BASED FILTER" by Priyadarshan Kolte et al., filed Aug. 21, 1997, with Ser. No. 08/918,611, and assigned to the assignee hereof.

FIELD OF THE INVENTION

The present invention generally relates to graphical filters, and more specifically to an efficient SIMD method of and apparatus for calculating a rank based filter for M×N elements organized as an M×N grid and for a rank based filter for a set of overlapping M×N subgrids of a larger grid.

BACKGROUND OF THE INVENTION

As computers grow faster and faster, computer users are able to use more advanced applications, requiring ever more speed from their computers. One of the most important application areas at present is graphics.

In graphics it is often necessary to filter two dimensional raster images. One type of nonlinear filter that is used to remove "shot" noise, pixel dropout, and other spurious features of single pixel extent while preserving overall image quality is to replace each input pixel with the median of itself and the surrounding input pixel values.

An example of finding the median of nine elements is shown on pages 171–175 in Graphics Gems, edited by Andrew S. Glassner, copyright 1990 by Academic Press, Inc., Harcourt Brace Jovanovich, Publishers, ISBN 0-12-286165-5. Actual code for that algorithm is shown on page 711. Code for an algorithm for computing the median of 25 elements arranged in a 5×5 grid is shown on page 712. These algorithms suffer from having to perform too many pairwise sort operations.

A method for determining the median of nine elements is disclosed in U.S. Pat. No. 5,532,948 to Maashiro Kohne, et. al., titled "Rank Order Filter", but this method is not control-flow-free because it compares certain values in the nine elements to decide what operations to perform in order to determine the median value. In contrast, the method disclosed in this patent uses a control-flow-free method for determining the median of M×N numbers because the operations to be performed are not dependent on the values of the M×N numbers. The advantage of a control-flow-free method is that implementing it on a Single Instruction Multiple Data (SIMD) processor makes more efficient use of processor parallelism than implementing a non control-flow-free method on the same SIMD processor.

A method for completely sorting nine, ten, twelve, and sixteen elements using a control-flow-free algorithm is shown on page 228 of The Art of Computer Programming, Volume 3, by Donald E. Knuth, copyright 1973 by Addison-Wesley Publishing Company, ISBN 0-201-03803-X. Section 5.3.4 of this book discusses other control-flow-free methods for sorting numbers as well. These methods are optimized for the case when a single set of numbers needs to be sorted once. They do not take advantage of opportunities for reducing the number of pairwise sorts which need to be made when multiple sorts of sets of numbers with common elements are to be made.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

An optimized method of sorting M×N numbers organized in an M×N array and for finding the median of M×N numbers are disclosed that requires substantially fewer comparison operations than required by the prior art and lends themselves better to parallel vector operation. These optimized sort and median calculations are then expanded to provide even more performance improvement by combining operations for adjacent grids, first shared rows, and then columns.

Figure 1:
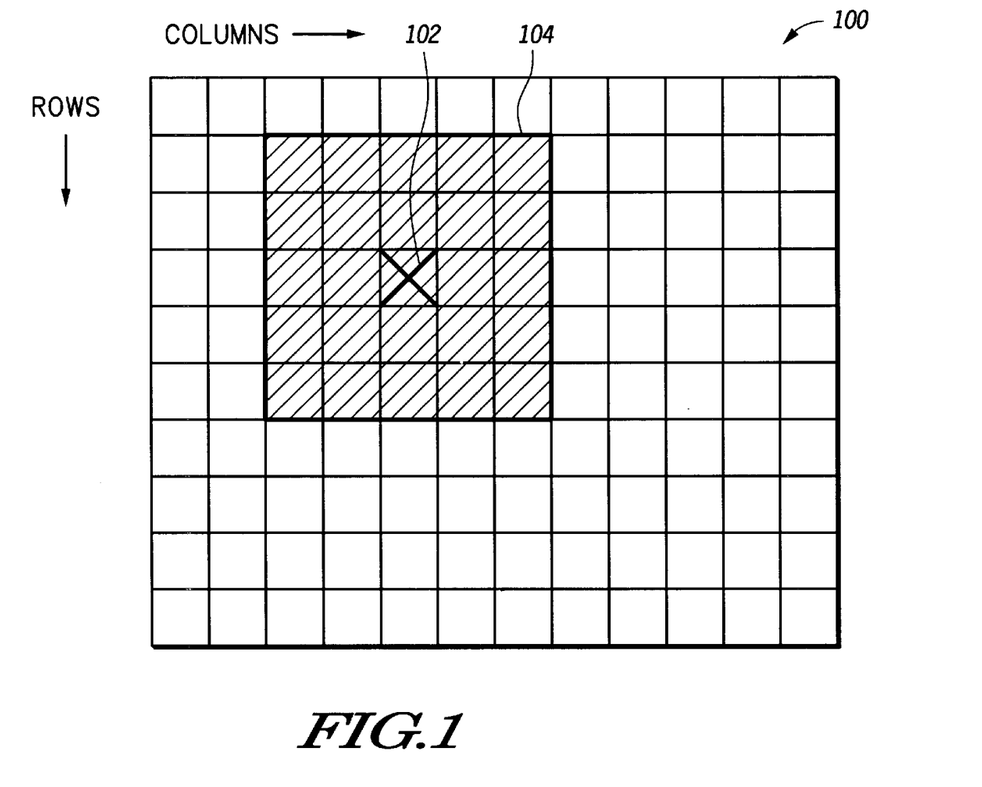
FIG. 1 is a drawing illustrating a two-dimensional raster image such as is received by image scanners, digital cameras, photocopy machines, laser printers, video monitors, and FAX machines.

FIG. 1 is a drawing illustrating a two-dimensional raster image such as is received by image scanners, digital cameras, photocopy machines, laser printers, video monitors, and FAX machines. The raster image is represented as a two-dimensional (2D) matrix or grid 100, with each cell in the matrix representing one pixel in the raster image. As is standard, columns are sets of vertically aligned matrix cells, while rows are sets of horizontally aligned matrix cells. A 5×5 subgrid or submatrix 104 containing a central raster pixel 102 is shown.

Figure 2:
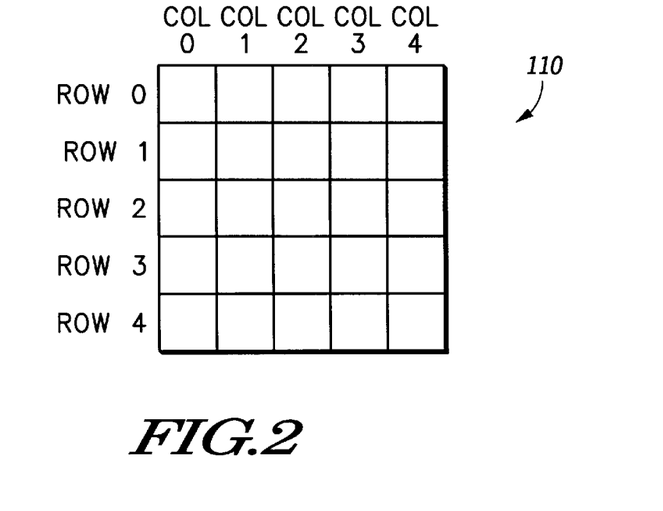
FIG. 2 is a drawing illustrating a five by five (5×5) matrix of pixels used to compute a median or weighted rank filter.

As noted above, one type of nonlinear filter replaces each raster pixel which is a center of a subgrid with the median of the pixels in the subgrid. This is termed a "median" filter. FIG. 2 is a drawing illustrating a five by five (5×5) matrix 110 of pixels used to compute such medians. This 5×5 matrix 110 corresponds to the 5×5 grid 104 surrounding a pixel 102 in FIG. 1. The 5×5 matrix 110 contains five rows: 0, 1, 2, 3, and 4, with each such row containing five elements or pixels, and five sequentially numbered (0, 1, 2, 3, & 4) columns again each containing five elements or pixels.

Figure 3:
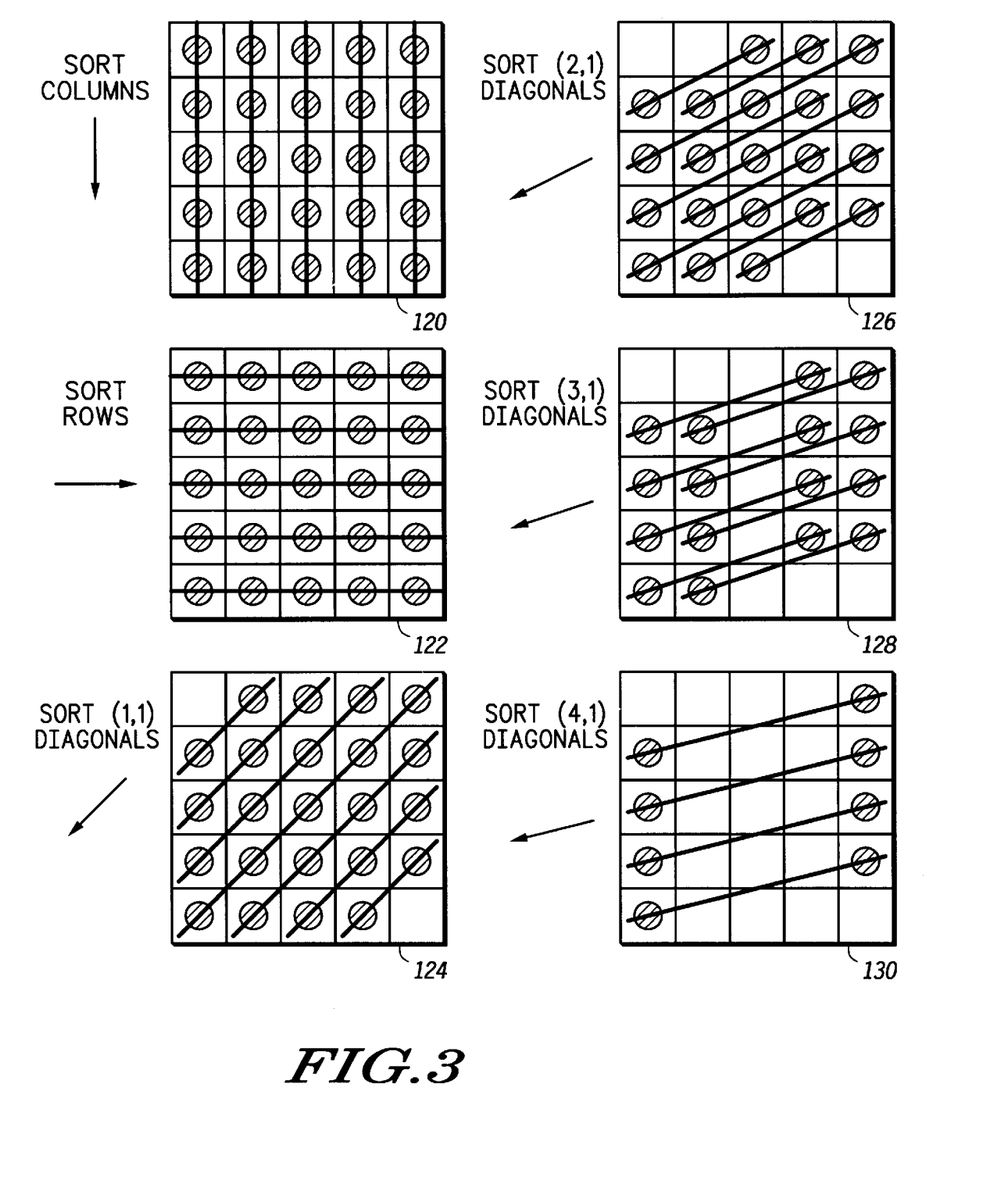
FIG. 3 is a diagram illustrating the sorting of a five by five matrix.

FIG. 3 is a diagram illustrating the sorting of a 5×5 matrix. First, the columns are sorted in ascending order 120. The arrows alongside each figure indicates the direction in which larger elements are moved by the sort. Then the rows are sorted 122. This is followed by a sort of the [1, 1] diagonals 124. The [1,1] diagonal sort 124 is followed by a [2,1] diagonal sort 126 and then a [3,1] diagonal sort 128. The final step is a [4,1] diagonal sort 130. The result is a 5×5 matrix sorted in row major order. This methodology can be extended to other M×N matrices where N is an odd number and M<=N by additional diagonal sorts. For example, a 5×7 matrix could be sorted by adding a [5,1] diagonal sort followed by a [6,1] diagonal sort.

Figure 4:
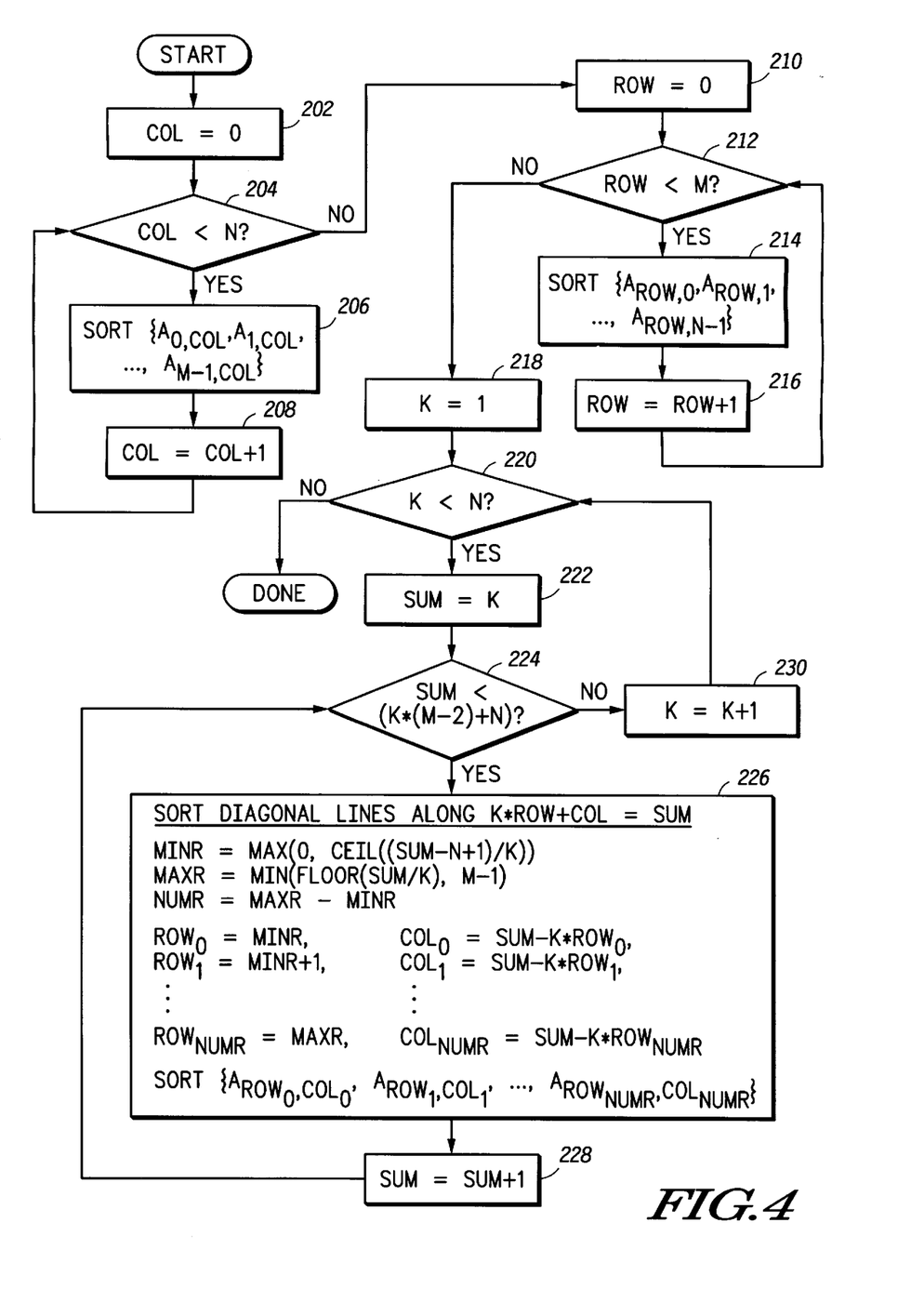
FIG. 4 is a flow chart that illustrates the technique of sorting an M×N matrix where N is an odd number and M<=N.

FIG. 4 is a flowchart that illustrates the technique of sorting an M×N matrix where N is an odd number and M<=N. FIG. 4 may be interpreted in two ways. First, it may be interpreted as a method for sorting an M×N matrix when M and N are not known in advance. Second, it may be used for particular values of M and N to determine the steps needed for sorting an M×N matrix. Those steps could then be implemented directly, rather than by using the control flow which is apparent in FIG. 4, whenever a sort of an M×N matrix with those particular values of M and N is required. The flow chart consists of three major loops, the column sort 120, the row sort 122, and the diagonal sorts 124 to 130 from FIG. 3.

FIG. 4 starts by initializing a column number (COL) to zero, step 202. The first loop is then entered, and a test is made of the column number (COL) against the number of columns in the matrix (N), step 204. As long as the column number (COL) is less than the number of columns (N), step 204, the body of the loop is executed. Within the body of the loop, a specific column specified by the column number (COL) is fully sorted, step 206. Then the column number (COL) is incremented, step 208, and the loop is repeated starting at step 204.

After executing the first loop, the second loop is entered to sort the rows. First the row number (ROW) is initialized to 0, step 210. Then a test is made whether the row number (ROW) is less than the number of rows (M), step 212. As long as the row number (ROW) is less than the number of rows (M), step 212, the body of the second loop is executed. Within that loop, the designated row is fully sorted, step 214, and the row number (ROW) is incremented, step 216. Then the loop repeats starting at the test of the row number (ROW) against the number of rows (M) in step 212.

The third loop sorts the diagonals. It actually consists of 2 nested loops: an inner loop and an outer loop. First, a variable (K) representing the inverse slopes of diagonal lines is set to 1, step 218. Then the outer loop is entered and a test is made whether K is less than the number of columns (N) in the matrix, step 220. As long as K is less than the number of columns (N), step 220, the outer loop is executed. Within the outer loop a variable (SUM) representing a particular diagonal line is set to K, step 222. Then the inner loop is entered and a test is made whether the variable SUM is less than a limit (K*(M−2)+N), step 224. As long as SUM is less than the limit, step 224, the body of the inner loop is executed. Within the body of the inner loop, a particular diagonal line is fully sorted. In order to determine which elements of the diagonal are to be sorted, 3 variables are first computed. MINR is the minimum row index of all elements on the diagonal and is computed as the maximum of 0 and CEILING((SUM−N+1)/K), where CEILING(x) denotes the smallest integer which is not less than x. MAXR is the maximum row index of all elements on the diagonal and is computed as the minimum of FLOOR(SUM/K) and (M−1), where FLOOR(x) denotes the largest integer which is not greater than x. Finally, NUMR is 1 less than the number of elements on the diagonal to be sorted and is computed as equal to (MAXR−MINR). If NUMR is 0, there is only one element on the diagonal and no sorting is required for the diagonal with that value of K and SUM. Otherwise, the indices of the elements in the diagonals being sorted are determined. The row index of the first element, $ROW_0$, is set to MINR. The column number for that element, $COL_0$, is set to (SUM−K*$ROW_0$). $ROW_1$ is set to (MINR+1), and $COL_1$ is set to (SUM−K*$ROW_1$). This is repeated for each element in the diagonal set that will be sorted. Once all of the rows and columns indices have been identified for each element that will be sorted on the diagonal, the elements are sorted, step 226. The SUM variable is then incremented, step 228, and the inner loop is repeated, starting at step 224. When the inner loop exits at step 224, the variable K is incremented, step 230, and the outer loop is repeated starting at step 220. The method is complete when the test at step 220 terminates the outer loop.

Again, for a specific choice of the values M and N, all of the necessary K values, SUM values, and indices of elements to be sorted can be predetermined by simply following the flowchart for that choice.

Figure 5:
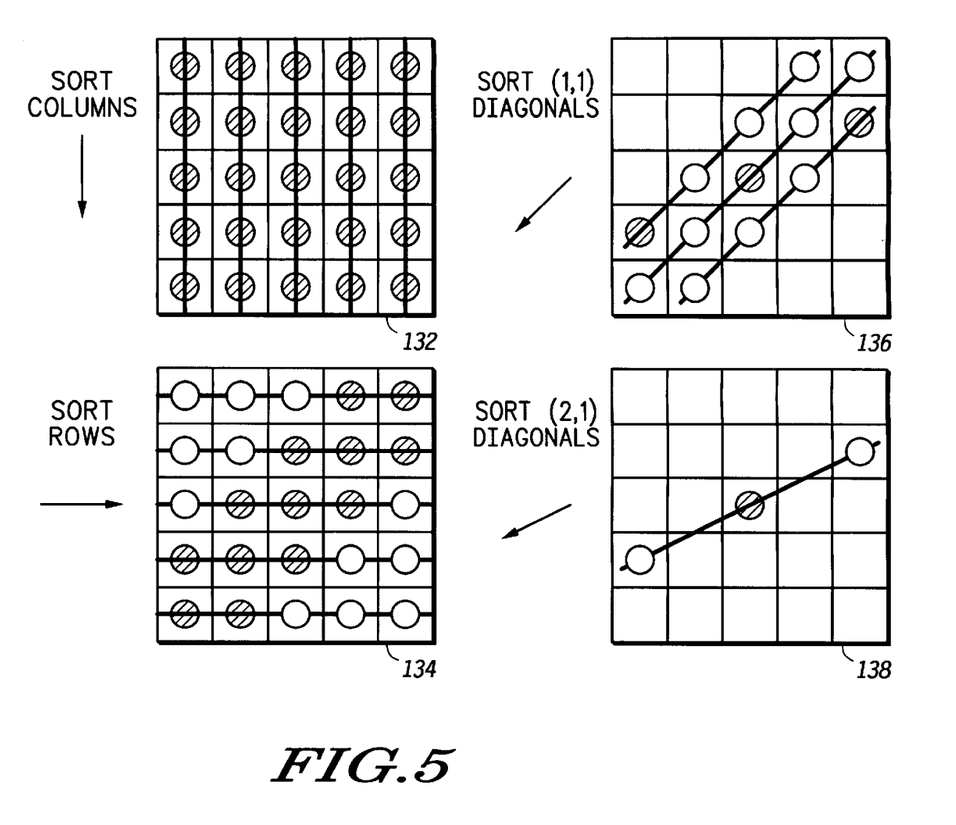
FIG. 5 is a diagram illustrating the computation of a 5×5 median filter.

FIG. 5 is a diagram illustrating computation of a 5×5 median filter. In FIG. 5, matrix cells are shown with shaded dots, white dots, and no dots. No dots indicate that a particular cell is not used in that step of the computation. White dots indicate that the cell is used in that step but not subsequently. Finally, shaded dots indicate that the result is used in both that step and in a subsequent step. The method starts by fully sorting the columns of the 5×5 matrix 132. This is followed by a partial row sort 134. Note that the top left and bottom right 3×3 triangles are shown as white dots, indicating that these elements are no longer used in subsequent steps. The row sort is followed by a sort of the [1,1] diagonals 136. Finally, the [2,1] diagonal is sorted 138 and the resulting filter value is located at the center of the 5×5 matrix.

Figure 6:
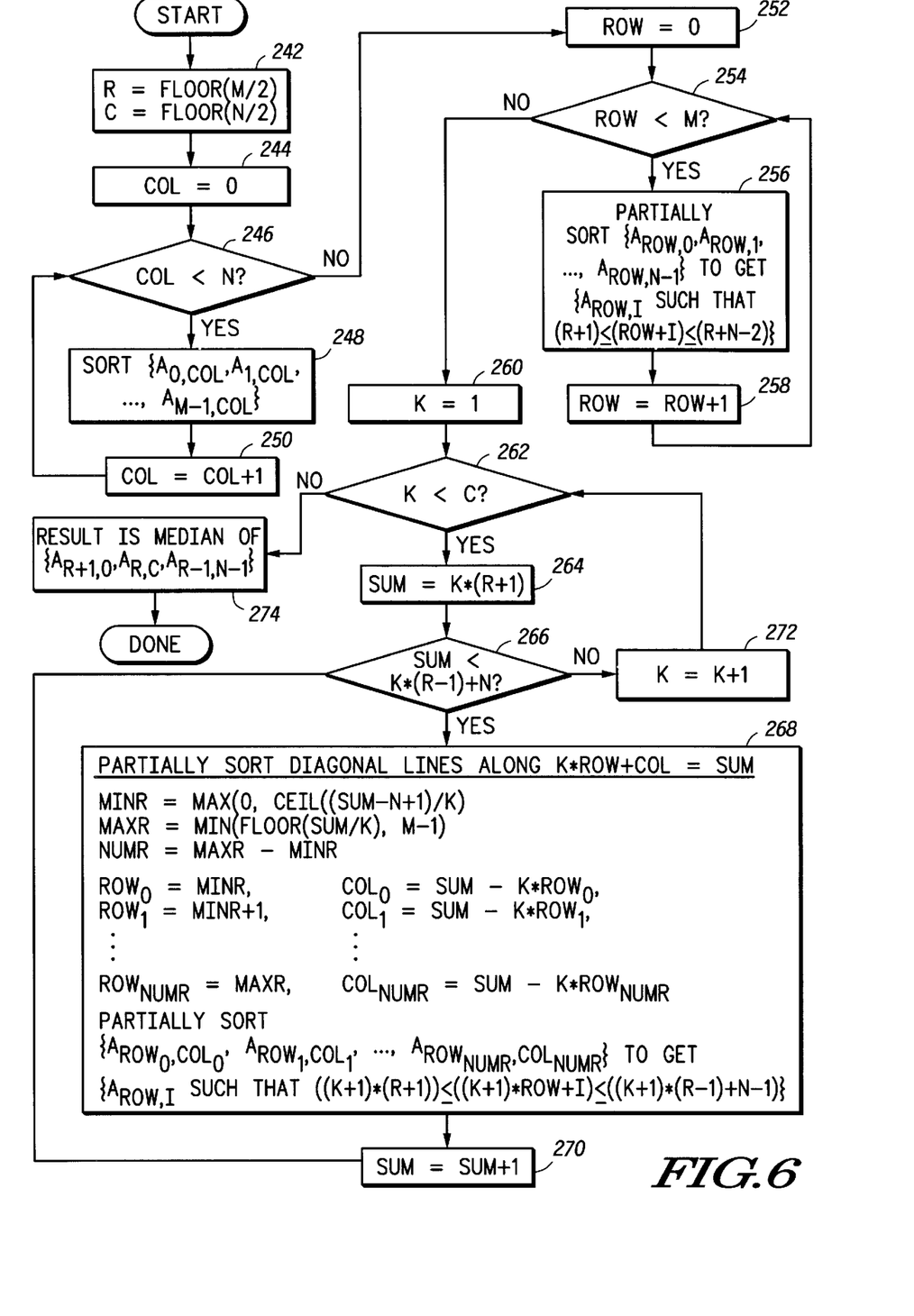
FIG. 6 is a flow chart illustrating computation of the median element in an M×N matrix where both M and N are odd numbers and M<=N.

FIG. 6 is a flow chart that illustrates the computation of the median element in an M×N matrix where M and N are odd numbers and M<=N. As with FIG. 4, FIG. 6 may be interpreted in two ways. First, it may be interpreted as a method for finding the median element of an M×N matrix when M and N are not known in advance. Second, it may be used for particular values of M and N to determine the steps needed for finding the median element of an M×N matrix. Those steps could then be implemented directly, rather than by using the control flow which is apparent in FIG. 4, whenever a median element of an M×N matrix with those particular values of M and N was required Again as with FIG. 4, FIG. 6 comprises 3 loops: a column sort, a row sort, and a diagonal sort.

The method starts by setting a variable C to the quotient obtained by dividing the number of columns (N) by 2, and setting a variable R to the quotient obtained by dividing the number of rows (M) by 2 step 242. The index variable for the first loop is then initialized by setting COL to 0, step 244. Then the first loop is entered, and a test is made whether column number (COL) is less than the number of columns (N), step 246. As long as COL is less than N, step 246, the body of the column sort loop is repeated. Within that column sort loop, the specified column (COL) is fully sorted, step 248, and the column number (COL) is incremented, step 250. Then the loop repeats, starting at step 246.

Upon exiting the column sort loop, the index of the row sort loop is initialized by setting ROW to 0, step 252. Then a test is made whether the row number (ROW) is less than the number of rows (M), step 254. As long as ROW is less than M, step 254, the body of the loop is executed. Within the body of the loop, the designated row (ROW) is partially sorted to get matrix elements A[ROW,I] such that (R+1) is less than or equal to (ROW+I) and (ROW+I) is less than or equal to (R+N-2), step 256. Then ROW is incremented, step 258, and the loop repeats starting at step 254.

Upon exiting the row sort loop, a doubly nested diagonal sort consisting of an outer loop and an inner loop is entered. First a variable representing the slope of the diagonal lines (K) is set to 1, step 260. Then the outer loop is entered and a test is made whether K is less than C, step 262. As long as K is less than C, step 262, the outer loop is executed and a variable SUM is set to (K*(R+1)), step 264. Then a test is made whether SUM is less than a limit (K*(R-1)+N), step 266. As long as SUM is less than the limit, step 266, the inner loop is executed. Within the inner loop, each diagonal line is partially sorted. In order to identify which elements to sort in a given iteration through the inner loop, three variables are computed. MINR is the minimum row index of all elements on the diagonal and is computed as the maximum of 0 and CEILING((SUM-N+1)/K). MAXR is the maximum row index of all elements on the diagonal and is computed as the minimum of FLOOR(SUM/K) and (M-1). NUMR is 1 less than the number of elements on the diagonal and is computed as (MAXR-MINR). Then for each element in the diagonal, the row and column indices are computed. $ROW_0$ index is set to MINR, and the column index for the first element is set equal to (SUM-K*$ROW_0$). A row index $ROW_1$ is set to (MINR +1), and a column ($COL_1$) index is set equal to (SUM-K*$ROW_1$). This is repeated for every element in the diagonal up to element NUMR, resulting in (NUMR+1) elements on the diagonal to be sorted. At this point the designated diagonal elements can be partially sorted to get A[ROW,I] such that ((K+1)*(R +1)) is less or equal to ((K+1)*ROW+I) and ((K+1)*ROW+I) is less than or equal to ((K+1)*(R-1)+(N-1)), step 268. Then the variable SUM is incremented, step 270, and the inner loop repeats starting at the test of SUM against the limit in step 266. When the inner loop is exited, variable K is incremented, step 272, and the outer loop repeats starting at the test of K less than C, step 262. When the outer loop is exited, the median is computed by calculating the median of elements A[R+1,0], A[R, C], and A[R-1,N-1], step 274.

Again, for a specific choice of the values M and N, all of the necessary K values, SUM values, and indices of elements to be partially sorted can be predetermined by simply following the flowchart for that choice.

Figure 7:
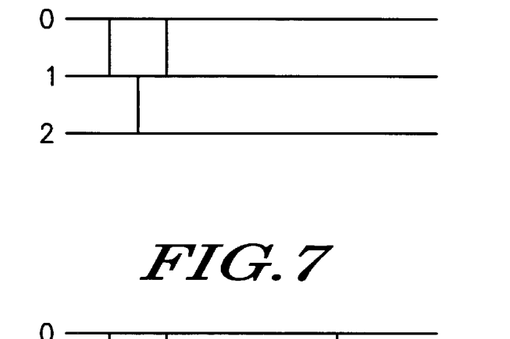
FIG. 7 illustrates a method of fully sorting 3 elements.

FIGS. 7–18 illustrate methods of partially or fully sorting 3, 4, or 5 elements. Referring back to FIG. 5, in instances where all of the elements in a row or column or a diagonal are shaded dots, then a full sort is called for. In instances however where some of the elements are white dots, the cells are not needed in subsequent steps, and a partial sort is sufficient. FIGS. 7–18 are pairwise sort sequences. For example, FIG. 7 is a sequence of pairwise sorts to fully sort 3 elements. The 3 elements are numbered 0, 1 and 2. A pairwise sort is performed on elements 0 and 1, then on elements 1 and 2, and then on elements 0 and 1 again. In each pairwise sort, the minimum element moves to the top and the maximum element moves to the bottom. Elements in the matrix are indicated by horizontal lines and pairwise sorts are indicated by vertical lines between horizontal lines. When a horizontal line ends at a vertical line, the result in that line is not needed and need not be calculated. In all of FIGS. 7–18, it does not matter which input element is assigned to which horizontal line.

Figure 8:
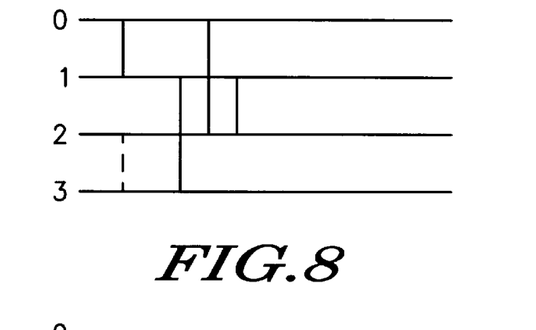
FIG. 8 illustrates a method of fully sorting 4 elements.

FIG. 8 illustrates a method of fully sorting 4 elements. Elements 0 and 1 are pairwise sorted, elements 2 and 3 are pairwise sorted, elements 1 and 3 are pairwise sorted, elements 0 and 2 are pairwise sorted, and elements 1 and 2 are pairwise sorted. The sort of elements 2 and 3 is shown as a dotted line in FIG. 8 indicating that this sort can be avoided by using the results of the pairwise sort of elements 0 and 1 in the special case when the elements are in vector registers and correlated pairwise sorts are done in parallel. Note that the pairwise sort between elements 0 and 1 and the pairwise sort between elements 2 and 3 are independent of each other and can be done in either order. Likewise, the pairwise sorts of elements 1 and 3 and the pairwise sorts of elements 0 and 2 are independent.

Figure 9:
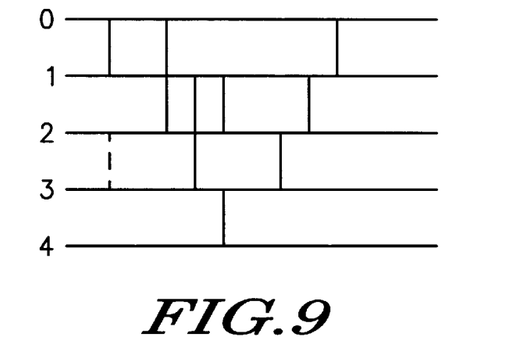
FIG. 9 illustrates a method of fully sorting 5 elements.

FIG. 9 illustrates a method of fully sorting 5 elements. The technique is to fully sort 4 elements as was done in FIG. 8, and then merge the 5th element into the fully sorted 4 elements. Note again that the pairwise sort of elements 2 and 3 can be avoided in certain situations, which is indicated by a dotted line for that pairwise sort.

Figure 10:
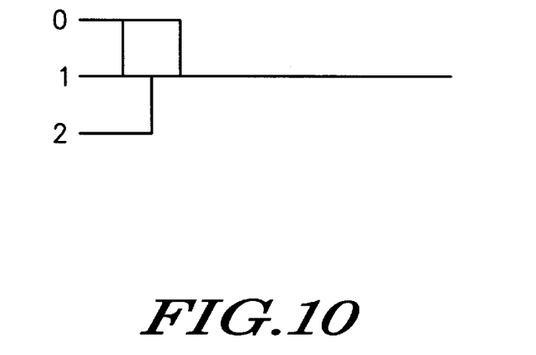
FIG. 10 illustrates a method of computing the median of 3 elements.

FIG. 10 illustrates a method of computing the median of 3 elements. Elements 0 and 1 are first pairwise sorted. Then the minimum of elements 1 and 2 is computed as the new element 1. Finally, the median is computed by computing the maximum of elements 0 and 1. Note here that neither the maximum of elements 1 and 2 nor the second minimum of elements 0 and 1 is computed because these values are not necessary for determining the median.

Figure 11:
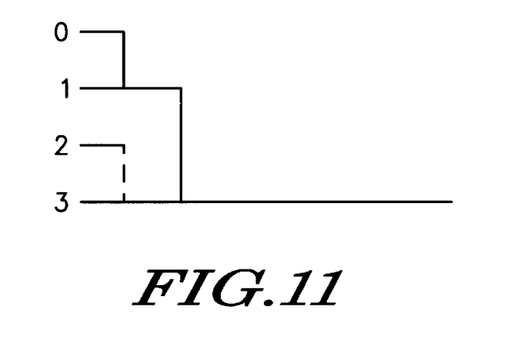
FIG. 11 illustrates a method of computing the biggest element of 4 elements.

FIG. 11 illustrates a method of computing the biggest element of 4 elements. It proceeds by computing the maxima of elements 0 and 1, elements 2 and 3, and elements 1 and 3. Note again that the computation of the maximum of elements 2 and 3 can be avoided if the elements are in a vector register in certain situations.

Figure 12:
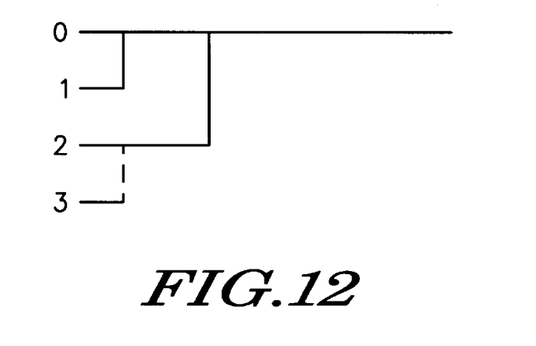
FIG. 12 illustrates a method of computing the minimum of 4 elements.

FIG. 12 illustrates a method of computing the minimum of 4 elements which has a structure similar to that of FIG. 11. The minimum of elements 0 and 1 is computed as element 0. Then the minimum of elements 2 and 3 is computed as element 2. This is followed by computing the minimum of elements 0 and 2. Again note that the computation of the minimum of elements 2 and 3 can be avoided in certain situations.

Figure 13:
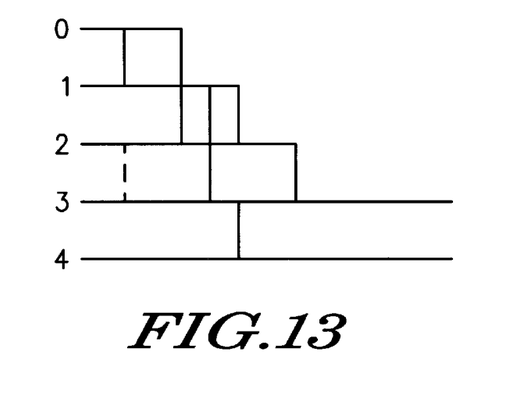
FIG. 13 illustrates a method of computing the 2 largest elements out of 5 elements.

FIG. 13 illustrates a method of computing the 2 largest elements of 5 elements. It starts by pairwise sorting elements 0 and 1 and elements 2 and 3. Again note that the pairwise sort of elements 2 and 3 can be avoided in certain instances. Then the maximum of elements 0 and 2 is computed.

Independently of this, elements 1 and 3 are pairwise sorted. Then, the maximum of elements 1 and 2 is computed. Independently of this, the pairwise sort of elements 3 and 4 is computed. Finally the maximum of elements 2 and 3 is computed. As a result of this sequence, element 4 is the largest element and element 3 is the second largest element of the 5 elements.

Figure 14:
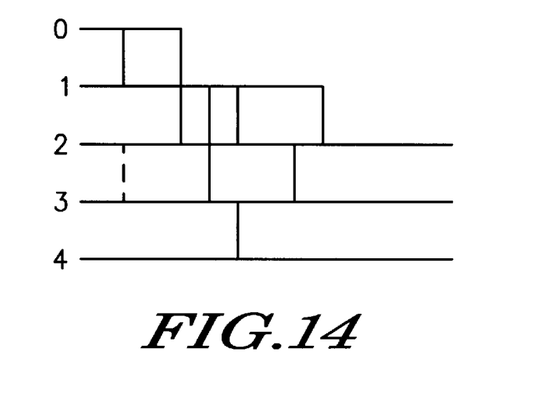
FIG. 14 illustrates a method of computing the 3 largest elements out of 5 elements.

FIG. 14 illustrates a method of computing the 3 largest of 5 elements. It starts by pairwise sorting elements 0 and 1 and elements 2 and 3. Again note that the pairwise sort of elements 2 and 3 can be avoided in certain instances. Then the maximum of elements 0 and 2 is computed. Independently of this, elements 1 and 3 are pairwise sorted. Then elements 1 and 2 are pairwise sorted. Independently of this, the pairwise sort of elements 3 and 4 is computed. Then elements 2 and 3 are pairwise sorted and the maximum of elements 1 and 2 is computed. As a result of this sequence, element 4 is the largest element, element 3 is the second largest element, and element 2 is the third largest element of the 5 elements.

Figure 15:
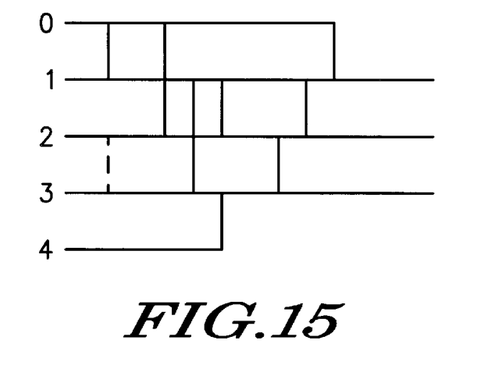
FIG. 15 illustrates a method of computing the 3 middle elements out of 5 elements.

FIG. 15 illustrates a method of computing the 3 middle elements of 5 elements. First, elements 0 and 1 and elements 2 and 3 are each pairwise sorted. Again note that the pairwise sort of elements 2 and 3 can be avoided in certain instances. Then elements 0 and 2 and elements 1 and 3 are pairwise sorted. Then elements 1 and 2 are pairwise sorted. Independently of this, the minimum of elements of 3 and 4 is computed. This is followed by a pairwise sort of elements 2 and 3, then a pairwise sort of elements 1 and 2, and finally a computation of the maximum of elements 0 and 1. Note that this is the full sort in FIG. 9 with the elimination of the computations of the minimum of elements 0 and 1 and the maximum of elements 3 and 4.

Figure 16:
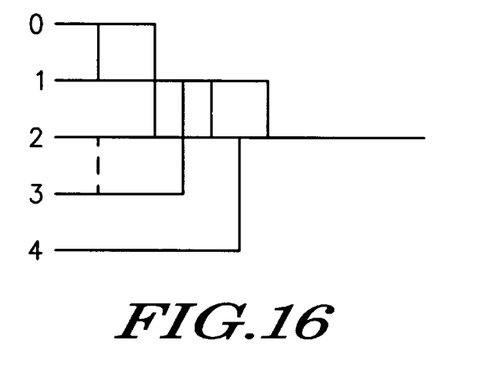
FIG. 16 illustrates a method of computing the median of 5 elements.

FIG. 16 illustrates a method of computing the median of 5 elements. First, elements 0 and 1 are pairwise sorted and elements 2 and 3 are pairwise sorted. Again note that the pairwise sort of elements 2 and 3 can be avoided in certain instances. Then the maximum of elements 0 and 2 is computed. Independently of this the minimum of elements 1 and 3 is computed. This is followed by a pairwise sort of elements 1 and 2. Next the minimum of elements 2 and 4 is computed. Finally, the maximum of elements 1 and 2 is computed to be the median of the 5 elements. Note here that FIG. 16 is more efficient than FIG. 15 would be with the second and fourth middle elements removed. However, it is can be obtained from an equally efficient complete sort of 5 elements by removing the unnecessary steps.

Figure 17:
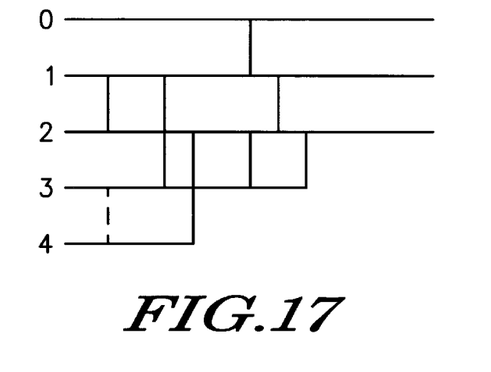
FIG. 17 illustrates a method of computing the 3 smallest elements of 5 elements.

FIG. 17 illustrates a method of computing the 3 smallest elements of 5 elements. It has a structure similar to FIG. 14, which computed the 3 largest elements of 5 elements.

Figure 18:
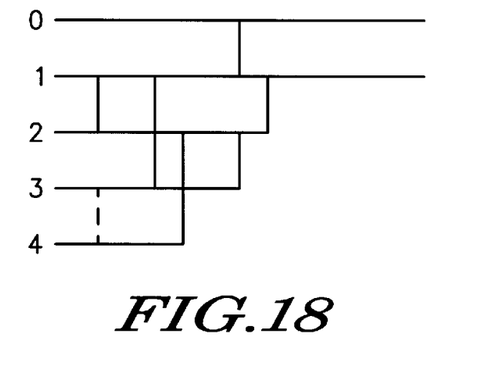
FIG. 18 illustrates a method of computing the 2 smallest elements of 5 elements.

FIG. 18 illustrates a method of computing the 2 smallest elements of 5 elements, and has structure similar to FIG. 13, which computed the 2 largest elements of 5 elements.

For values of M and N other than 5, the methods described in FIG. 4 and FIG. 6 will require full or partial sorts of sets of different sizes from those described in FIGS. 7–18. While optimum sorts are not known for all numbers of elements, a number of important optimal full sorts are described in the teachings of Donald Knuth referenced above. These teachings also describe the Batcher merge exchange sort which gives a good (but not always optimal) sort for any number. A partial sort method can be obtained from any full sort method by eliminating pairwise sorts in which neither output contributes to a desired output element or replacing the pairwise sort by a maximum or a minimum when just one of the outputs contributes to a desired output element.

Figure 19:
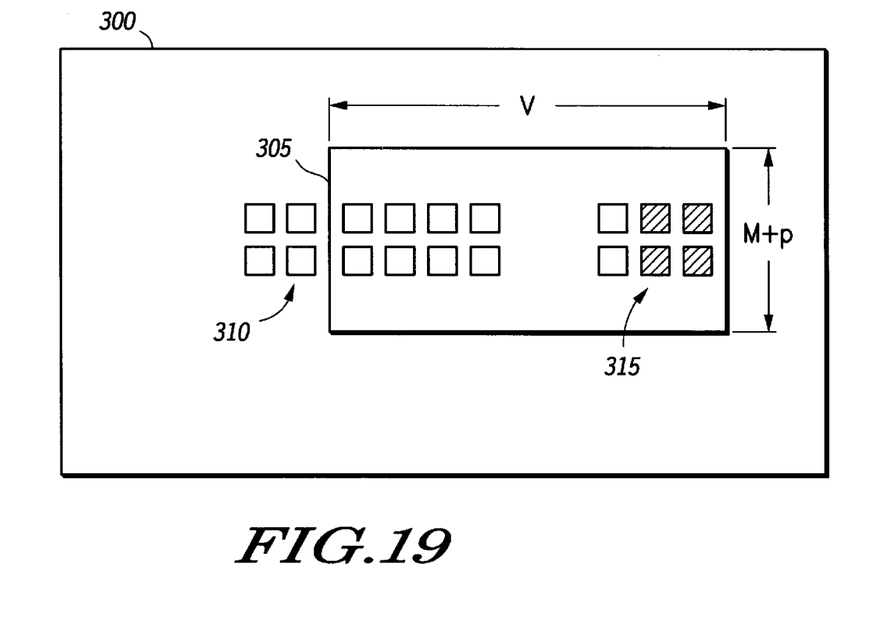
FIG. 19 illustrates the computation of V rank or median filters for a number (p+1)*V overlapping subgrids of a larger grid.

FIG. 19 illustrates the computation of a rank-based filter or a median filter on a SIMD processor which can perform the same operation simultaneously on V independent sets of data. A large grid 300 is processed in a series of operations performed on subgrids of size (M+p)×V which compute a new grid containing the results of (p+1)*V overlapping M×N subgrids. Successive subgrids may be taken to cover the first V columns, the second V columns, and so on across the large grid 300. A particular subgrid of size (M+p)×V 305 is shown. In addition to the elements of the size (M+p)×V subgrid, the method uses a history grid for each of the (p+1) M×V subgrids. Each history grid contains at least (N−1) elements of the sorted columns from the immediately preceding M×V subgrid. For first M×V subgrids in the large grid 300, the values of the history grid are immaterial, since they only affect border values, and these will later be overwritten. The operations performed compute the pixel values 310 of the rank-based or median filter for (p+1)* ((N−1)/2) pixels in a preceding subgrid of size (M+p)×V and (p+1)*(V−(N−1)/2) pixels in the subgrid 305. Some pixels in the subgrid 305 will have their pixel values 315 computed by subsequent operations on another subgrid. Border values within a distance ((N−1)/2) of a vertical boundary or a distance ((M−1)/2) of a horizontal boundary are generated by copying them from the old grid to the new grid. The pixels 310 and 315 in FIG. 19 are representative of the case N=5 and p=1.

Figure 20:
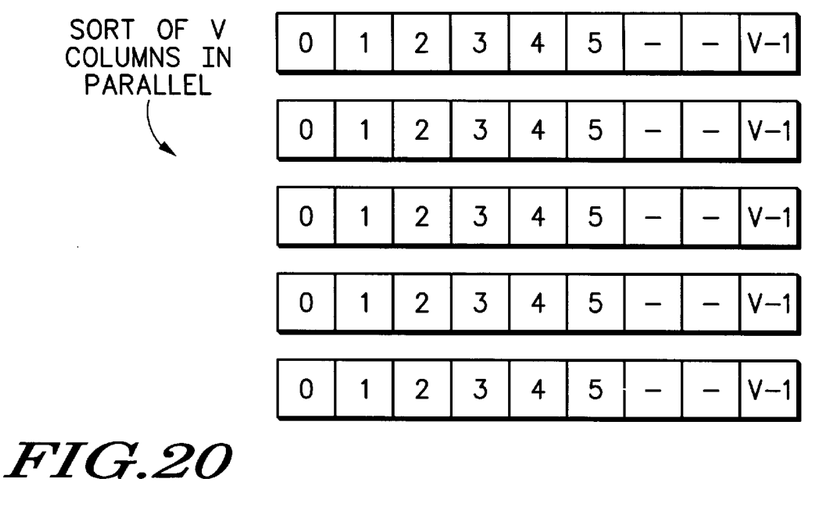
FIG. 20 illustrates the sorting of V columns in parallel.
Figure 21:
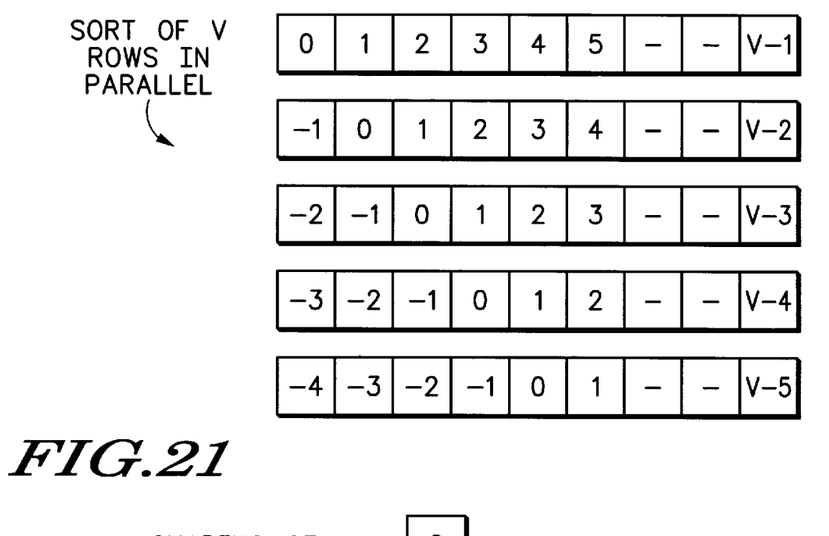
FIG. 21 illustrates the sorting of V rows in parallel.
Figure 22:
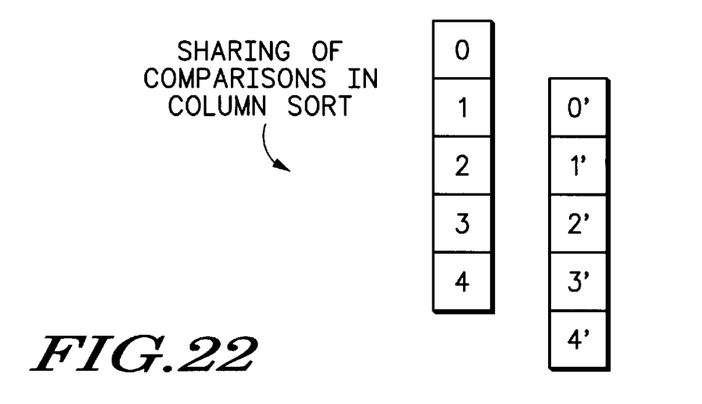
FIG. 22 illustrates the sharing of pairwise sorts in two column sorts.

The method utilizes the principles illustrated in FIGS. 1–18 for sorting and takes further advantage of the sharing of sets of original pixel elements by multiple overlapping M×N subgrids. In particular, it takes advantage of the sharing of column elements among the (p+1) sets of vertically overlapping subgrids and the sharing of row elements among the V sets of horizontally overlapping subgrids which include (N−1)/2 prior overlapping subgrids and (V−(N−1)/2) overlapping subgrids contained within the subgrid 305. It also takes advantage of the capabilities of a SIMD processor to perform the same operation on V sets of data elements at the same time. All of these techniques increase the efficiency of finding the multiple rank-based or median filter values for the subgrid 305. FIGS. 20–22 illustrate these methods.

FIG. 20 illustrates for M=5 a method for performing a number V of column sorts in parallel using a SIMD processor. The first line represents a vector register which contains V consecutive column elements from the first row, succeeding lines represent vector registers containing V consecutive columns from succeeding rows. In a SIMD processor, a pairwise sort using a pair of vector registers simultaneously performs an independent pairwise sort on each pair of column elements. This enables V pairwise sorts to be done in parallel. The method of FIG. 9 applied to these registers would fully sort all V columns in 9 vector pairwise sort operations. The sorted M×V values from a particular M×V subgrid which is a subgrid of the particular (M+p)×V subgrid are to be saved in the history grid for the next (M+p)×V subgrid after the history grid has been used for the row sorts. Typically a pairwise sort on a SIMD processor may be performed as a pair of minimum/maximum instructions or as a triplet of compare, select, and select instructions without any control flow. This parallel sorting of M rows of V columns is advantageous for three reasons. First, it fully utilizes the SIMD architecture. Second, the results of V column sorts, taken together with the V column sorts done on the previous subgrid, are sufficient to enable row sorting to be done for V horizontally overlapping subgrids simultaneously, as will be described with FIG. 21. Third, the column sorting for p+1 sets of M rows can be performed more efficiently as will be described with FIG. 22.

FIG. 21 illustrates efficient parallel sorting of the elements of a given row for each of V overlapping N-element sets. The V elements of that row from the subgrid 305 are loaded into a first register which is shown as the first register in FIG. 21, while the V elements of the corresponding row from the history grid are loaded into a history register (not shown). The second register in FIG. 21 is obtained by shifting the history and first registers by one element, and each additional register in FIG. 21 is obtained by shifting the history and first registers by one additional element. Altogether N registers are produced for an M×N filter. The numbers shown in the registers are 0 for the first element, 1 for the second element, and so on. The number −1 is for the last element of the history register, −2 is for the next-to-last element of the history register, and so on. Corresponding elements of these N registers are then precisely the row elements needed for row sorting for each of V overlapping N-element sets. The row sorting is then performed easily in parallel. For the 5×5 filter, for example, the partial sorts needed 134 can be performed by parallel execution of the partial sorts shown in FIGS. 13, 14, 15, 17, 18, corresponding to rows 0, 1, 2, 3 or 4 of a 5×5 grid. Once the history grid has been used, its new value obtained by column sorting can be stored in it for use in the next (M+p)×V subgrid.

The dotted lines in FIGS. 13–18 can now be explained. The first two pairwise sorts of each partial sort operate on different register pairs, yet produce results which are similar except for an offset. For some SIMD processors, it is advantageous to first do one of these two pairwise sorts and then to obtain the other by shifting the result of the first pairwise sort with the result of a pairwise sort from the prior (M+p)×V subgrid. Effectively, this replaces one pairwise sort by two shift operations.

FIG. 22 illustrates efficiency gains obtained in column sorting by choosing values of p which are larger than 0; the illustrated value is p=1 for M=5. In any instance where M elements are being sorted, the sort can be broken into a sort of M−p elements followed by a merge of p other elements. FIG. 22 shows that rows 1–4 of (0–4) are the same as rows 0'–3' of (0'–4') in a 6×V subgrid 305. To avoid performing two independent full 5-element sorts (using at least 18 pairwise sorts), the method first sorts columns of rows 1–4 (using 5 pairwise sorts), merges in columns of row 0 (using 4 pairwise sorts) to obtain a column sort of rows 0–4 and separately merges in columns of row 4' (using 4 pairwise sorts) to obtain a column sort of rows 0'–4'. This represents a savings for the 6×V subgrid of 18−(5+4+4)=5 pairwise sorts. This mechanism significantly reduces the number of pairwise sorts necessary to sort columns in vertically adjacent overlapping M×N subgrids.

A rank-based filter for a subgrid is obtained by summing the products obtained by multiplying each element of the subgrid by a predetermined number corresponding to its rank. This is a simple dot product once the subgrid has been sorted. If it is predetermined that coefficients of one or more ranks is zero, then the elements in those ranks need not be determined. The median filter is a special case in which the middle-ranked element, the median, has a weight of 1 and all other elements have a weight of 0. When it is predetermined that one or more of the ranks has zero weight, then it is straightforward to optimize the sort which is described in this patent by eliminating all pairwise sorts in which neither output is needed and replacing each pairwise sort in which only one output is needed by a minimum or a maximum operation.

Different permutations of the above methods are apparent to the practitioner skilled in the relevant art. The methods shown as flowchart in FIG. 4 results in matrices sorted in row major order. This method can be simplified using standard optimization techniques to compute any lesser number of rank elements by eliminating computations of any unneeded elements, since all rank elements have been computed by the methods in this FIG. One result of such simplifications is the method for computing median filter values disclosed above in relation to the flowchart in FIG. 6.

Figure 23:
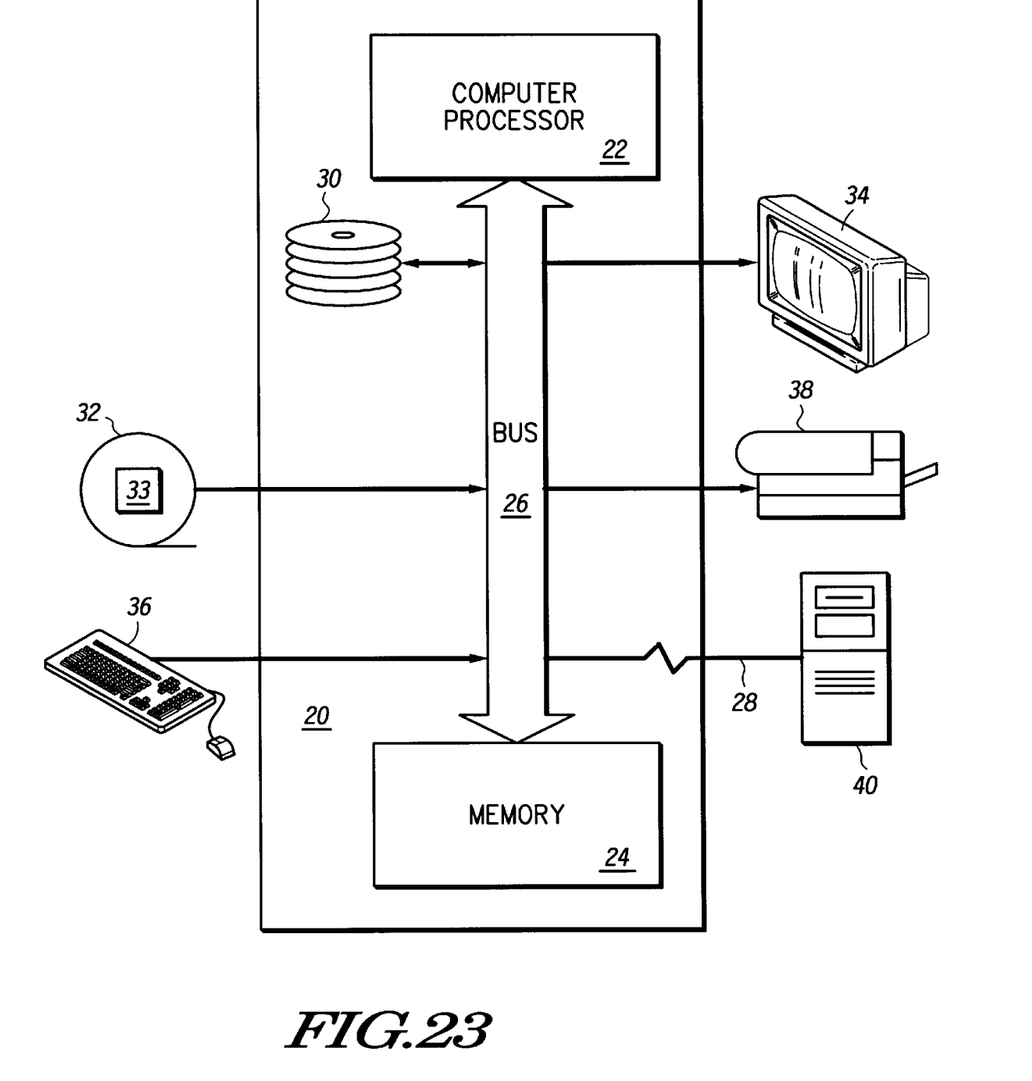
FIG. 23 is a block diagram showing a General Purpose Computer that can be used to implement the methods disclosed herein.

FIG. 23 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience in describing the invention. As such, it should be appreciated that there is substantial functional overlap between these elements. Computer software such as programs implementing the methods disclosed herein for calculation of median filter values for elements stored in M×N matrices and for sorting elements stored in M×N matrices and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

While the methods disclosed herein provide for efficient calculation of median filter values for elements stored in M×N matrices and of sorting elements stored in M×N matrices using conventional single instruction, single data (SISD) processors as illustrated in FIG. 23, they are especially useful when used with single instruction, multiple data (SIMD) vector processors. One such SIMD processor that supports maximum and minimum vector operations is disclosed in U.S. Pat. No. 5,600,846 to Michael Gallup, et. al., titled "Data Processing System and Method Thereof", assigned to assignee hereof, and incorporated herein by reference.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of fully sorting an M×N matrix stored in a memory using a data processing system, wherein:
the M×N matrix has M rows and N columns,
M<=N,
N is an odd number >3,
said method comprising:
A) fully sorting each of the N columns;
B) fully sorting each of the M rows;
C) selecting a slope value (K) equal to one (1);
D) selecting a set of all (K,1) diagonal lines with slope 1/K and at least two elements, and fully sorting each diagonal line of elements in the set of all (K,1) diagonal lines; and
E) repeating step (D) as a diagonal loop selecting successive integers from 2 to N−1 as the slope value (K).

2. The method in claim 1 wherein:
step (D) comprises:
1) initializing a second index (SUM) equal to the slope value (K),
2) selecting a diagonal line of cells $D_K=(A[row_i,col_i])$ to sort from a set of all (K,1) selected diagonal lines, wherein:
MINR=max(0,ceiling((SUM−N+1)/K)),
MAXR=min(floor(SUM/K), M−1),
NUMR=MAXR-MINR, and
$row_i$=MINR+i and $col_i$=sum-(K*$row_i$),
for all 0<=i<=NUMR;
3) sorting a diagonal set of cells $D_K$ if NUMR >0;
4) incrementing the second index (SUM),
5) testing whether the second index (SUM) is less than an inner loop limit of K*(M−2)+N,
6) repeating steps (2), (3), (4), and (5) while the second index (SUM) is less than the inner loop limit; and
step (E) comprises:
1) incrementing the slope value (K),
2) testing whether the slope value (K) is less than N, and
3) iterating the diagonal loop while the slope value (K) is less than N.

3. The method in claim 1 wherein:
the diagonal loop in steps (C), (D), and (E) is unrolled.

4. The method in claim 1 wherein:
M is equal to N.

5. The method in claim 4 wherein:
M and N are both equal to one of a set of 5, 7, 9, 11, 13, 15, 17, 19, 21, 23 and 25.

6. A method of computing a median for an M×N matrix stored in a memory in a data processing system, wherein:
the M×N matrix has M rows and N columns,
M<=N,
M is an odd integer, and
N is an odd integer >3,
said method comprising:
A) fully sorting each of the N columns;
B) partially sorting each of the M rows;
C) selecting a slope value (K) equal to one (1);
D) selecting a set of all (K,1) diagonal lines with slope 1/K and at least two elements, and partially sorting each diagonal line of elements in the set of all (K,1) diagonal lines; and
E) repeating step (D) as a diagonal loop selecting successive integers from 2 to N−1 as the slope value (K).

7. The method in claim 6 wherein:
step (D) comprises:
1) initializing a second index (SUM) equal to the slope value (K),
2) selecting a diagonal line of cells $D_K=(A[row_i,col_i])$ to sort from a set of all selected (K,1) diagonal lines, wherein:
MINR=max(0,ceiling((SUM−N+1)/K)),
MAXR=min(floor(SUM/K), M−1),
NUMR=MAXR-MINR, and
$row_i$=MINR+i and $col_i$=sum-(K*$row_i$),
for all 0<=i<=NUMR;
3) sorting the diagonal set of cells $D_K$ if NUMR >0;
4) incrementing the second index (SUM),
5) testing whether the second index (SUM) is less than an inner loop limit of K*(M−2)+N,
6) repeating steps (2), (3), (4), and (5) while the second index (SUM) is less than the inner loop limit; and
step (E) comprises:
1) incrementing the slope value (K),
2) testing whether the slope value (K) is less than N, and
3) iterating the diagonal loop while the slope value (K) is less than N.

8. The method in claim 6 wherein:
the diagonal loop in steps (C), (D), and (E) is unrolled and unnecessary sorting operations eliminated.

9. The method in claim 6 wherein:
M is equal to N.

10. The method in claim 9 wherein:
M and N are both equal to one of a set of 5, 7, 9, 11, 13, 15, 17, 19, 21, 23 and 25.

11. A method of sorting a set of (p+1) overlapping M×N subgrids contained in an (M+p)×N grid stored in a memory in a data processing system, wherein:
each of the set of (p+1) overlapping M×N subgrids has M rows and N columns,
M, N, and p are positive integers,
M<=N, and
N>3,
said method comprising:
A) fully sorting in the data processing system each of the N columns of a (M+p)×N row subgrid stored in the memory to create a set of N sorted partial columns;
B) selecting an M×N subgrid of the (M+p)×N grid stored in the memory containing the set of N sorted partial columns as a selected M×N subgrid;
C) fully sorting in the data processing system each of the N columns of the selected M×N subgrid stored in the memory using the set of N sorted partial columns to obtain a column-sorted M×N subgrid;
D) fully sorting in the data processing system each of the M rows of the column-sorted M×N subgrid to obtain a resulting M×N subgrid;
E) selecting a slope value (K) equal to one (1);
F) selecting a set of all (K,1) diagonal lines with slope 1/K and at least two elements in the resulting M×N subgrid, and fully sorting in the data processing system each diagonal line of elements in the set of all (K,1) diagonal lines in the resulting M×N subgrid;
G) repeating step (F) as a diagonal loop selecting successive integers from 2 to N−1 as the slope value (K); and
H) repeating steps (C), (D), (E), (F), and (G) selecting each remaining M×N subgrid of the (M+p)×N grid stored in the memory as the selected M×N subgrid.

12. The method in claim 11, wherein:

At least one of a set of steps comprising steps (A), (C), (D), (E), (F), and (G) is performed in parallel for each M×N subgrid of the set of (p+1) overlapping M×N subgrids.

13. The method in claim 11, wherein:

processing is performed in a SIMD processor with at least V processing elements, and steps (A) and (C) sort V columns in parallel.

14. The method in claim 11 wherein:

M is equal to N.

15. The method in claim 14 wherein:

M and N are both equal to one of a set of 5, 7, 9, 11, 13, 15, 17, 19, 21, 23 and 25.

16. A method of computing a set of (p+1) median filters for a set of (p+1) overlapping M×N subgrids contained in an (M+p)×N grid stored in a memory in a data processing system, wherein:

each of the set of (p+1) overlapping M×N subgrids has M rows and N columns,

M, N, and p are positive integers,

M<=N, and

N>3, said method comprising:
  A) fully sorting in the data processing system each of the N columns of a (M+p)×N row subgrid stored in the memory to create a set of N sorted partial columns;
  B) selecting an M×N subgrid of the (M+p)×N grid stored in the memory containing the set of N sorted partial columns as a selected M×N subgrid;
  C) fully sorting in the data processing system each of the N columns of the selected M×N subgrid stored in the memory using the set of N sorted partial columns to obtain a column-sorted M×N subgrid;
  D) partially sorting in the data processing system each of the M rows of the column-sorted M×N subgrid to obtain a resulting M×N subgrid;
  E) selecting a slope value (K) equal to one (1);
  F) selecting a set of all (K,1) diagonal lines with slope 1/K and at least two elements in the resulting M×N subgrid, and partially sorting in the data processing system each diagonal line of elements in the set of all (K,1) diagonal lines in the resulting M×N subgrid;
  G) repeating step (F) as a diagonal loop selecting successive integers from 2 to N−1 as the slope value (K); and
  H) repeating steps (C), (D), (E), (F), and (G) selecting each remaining M×N subgrid of the (M+p)×N grid stored in the memory as the selected M×N subgrid.

17. The method in claim 16, wherein:

At least one of a set of steps comprising steps (A), (C), (D), (E), (F), and (G) is performed in parallel for each M×N subgrid of the set of (p+1) overlapping M×N subgrids.

18. The method in claim 16, wherein:

processing is performed in a SIMD processor with at least V processing elements, and steps (A) and (C) sort V columns in parallel.

19. The method in claim 16 wherein:

M is equal to N.

20. The method in claim 19 wherein:

M and N are both equal to one of a set of 5, 7, 9, 11, 13, 15, 17, 19, 21, 23 and 25.

21. A method of computing a rank-based M×N filter on an H×W grid stored in a memory in a data processing system to produce a filtered H×W grid, wherein:

M is a positive integer,

N is an odd integer >3, p is a positive integer,

V is a positive integer >=N,

W>=V,

H>=M+p, and

M<=N, said method comprising:
  A) selecting an (M+p)×W source subgrid of the H×W grid stored in the memory;
  B) initializing a history grid;
  C) selecting an (M+p)×V working grid of the (M+p)×W source subgrid, wherein: the (M+p)×V working grid has a plurality of columns;
  D) partially sorting all of the plurality of columns of the (M+p)×V working grid;
  E) computing the rank-based M×N filter on all M×N subgrids of the (M+p)×V working grid using the history grid to produce a set of values for an (M+p)×V subgrid of the filtered H×W grid corresponding to the (M+p)×V working grid and rewriting the history grid with a new set of values;
  F) repeating steps (C), (D) and (E) until the rank-based M×N filter has been applied to all M×N subgrids of the (M+p)×W source subgrid;
  G) repeating steps (A), (B), (C), (D), (E), and (F) until the rank-based M×N filter has been applied to all M×N subgrids of the H×W grid; and
  H) assigning border values to the filtered H×W grid.

22. The method in claim 21, wherein:

processing is performed in a SIMD processor with at least V processing elements.

23. The method in claim 21, wherein step (E) comprises:
  1) selecting a particular M×V subgrid of the (M+p)×V working grid;
  2) fully sorting V columns of the particular M×V subgrid using partially sorted columns of the (M+p)×V working grid to generate a set of V fully sorted columns;
  3) selecting a row from the particular M×V subgrid as a selected row and a corresponding row from the history grid;
  4) selecting an integer value Q from a set 0 to N−1;
  5) loading into one of a set of N registers for the selected row a vector of elements consisting of the last Q elements of the corresponding row of the history grid and a first V−Q elements of a selected row of the set of V fully sorted columns;
  6) fully sorting the set of N registers for the selected row;
  7) repeating steps (3), (4), (5), and (6) for each of M rows of the particular M×V subgrid to produce a set of M×N registers of size V elements;
  8) saving a last N−1 elements of the set of V fully sorted columns of the particular M×V subgrid in the history grid and setting a slope value (K) to one (1),
  9) interpreting the set of M×N registers of size V elements as an M×N array of size V elements and selecting a set of all (K,1) diagonal lines with slope 1/K and at least two elements, and fully sorting corresponding elements in each diagonal line of elements in the set of all (K,1) diagonal lines;
  10) repeating substep (9) as a diagonal loop selecting successive integers from 2 to N−1 as the slope value (K), resulting in a sorted set of M×N registers;

11) computing rank-based filter values on corresponding elements of the sorted set of M×N registers; and
12) storing the rank-based filter values corresponding to the (M+p)×V subgrid into the filtered H×W grid.

24. The method in claim 21 wherein:

loops have been unrolled and unnecessary sorting operations eliminated.

25. A method of computing a rank-based M×N filter on an H×W grid stored in a memory in a data processing system to produce a filtered H×W grid, wherein:

M is a positive integer,
N is an odd integer >3,
p is a non-negative integer,
V is a positive integer >=N,
M<=N, and
said method comprising:
  A) selecting an (M+p)×W source subgrid of the H×W grid stored in the memory;
  B) initializing a history grid;
  C) selecting an (M+p)×V working grid of the (M+p)×W source subgrid, wherein: the (M+p)×V working grid has a plurality of columns;
  D) partially sorting all of the plurality of columns of the (M+p)×V working grid;
  E) computing the rank-based M×N filter on all M×N subgrids of the (M+p)×V working grid using the history grid to produce a set of values for an (M+p)×V subgrid of the filtered H×W grid corresponding to the (M+p)×V working grid and rewriting the history grid with a new set of values, comprising:
    1) selecting a particular M×V subgrid of the (M+p)×V working grid;
    2) fully sorting V columns of the particular M×V subgrid using partially sorted columns of the (M+p)×V working grid to generate a set of V fully sorted columns;
    3) selecting a row from the particular M×V subgrid as a selected row and a corresponding row from the history grid;
    4) selecting an integer value Q from a set 0 to N−1;
    5) loading into one of a set of N registers for the selected row a vector of elements consisting of the last Q elements of the corresponding row of the history grid and a first V−Q elements of a selected row of the set of V fully sorted columns;
    6) fully sorting the set of N registers for the selected row;
    7) repeating steps (3), (4), (5) and (6) for each of M rows of the particular M×V subgrid to produce a set of M×N registers of size V elements;
    8) saving a last N−1 elements of the set of V fully sorted columns of the particular M×V subgrid in the history grid and setting a slope value (K) to one (1),
    9) interpreting the set of M×N registers of size V elements as an M×N array of size V elements and selecting a set of all (K,1) diagonal lines with slope 1/K and at least two elements, and fully sorting corresponding elements in each diagonal line of elements in the set of all (K,1) diagonal lines;
    10) repeating substep (9) as a diagonal loop selecting successive integers from 2 to N−1 as the slope value (K), resulting in a sorted set of M×N registers;
    11) computing rank-based filter values on corresponding elements of the sorted set of M×N registers; and
    12) storing the rank-based filter values corresponding to the (M+p)×V subgrid into the filtered H×W grid;
  F) repeating steps (C), (D) and (E) until the rank-based M×N filter has been applied to all M×N subgrids of the (M+p)×W source subgrid;
  G) repeating steps (A), (B), (C), (D), (E), and (F) until the rank-based M×N filter has been applied to all M×N subgrids of the H×W grid; and
  H) assigning border values to the filtered H×W grid.

26. The method in claim 25, wherein:

processing is performed in a SIMD processor with at least V processing elements.

27. The method in claim 25 wherein:

loops have been unrolled and unnecessary sorting operations eliminated.

28. A method of computing an M×N median filter on an H×W grid stored in a memory in a data processing system to produce a filtered H×W grid, wherein:

M is an odd integer,
N is an odd integer >3,
p is a positive integer,
V is a positive integer >=N,
M<=N, and
said method comprising:
  A) selecting an (M+p)×W source subgrid of the H×W grid stored in the memory;
  B) initializing a history grid;
  C) selecting an (M+p)×V working grid of the (M+p)×W source subgrid, wherein: the (M+p)×V working grid has a plurality of columns;
  D) partially sorting all of the plurality of columns of the (M+p)×V working grid to generate a plurality of partially sorted columns;
  E) computing the M×N median filter on all M×N subgrids of the (M+p)×V working grid using the history grid to store a set of V values for an (M+p)×V subgrid into the filtered H×W grid corresponding to the (M+p)×V working grid and rewriting the history grid with a new set of values;
  F) repeating steps (C), (D) and (E) until the M×N median filter has been applied to all M×N subgrids of the (M+p)×W source subgrid;
  G) repeating steps (A), (B), (C), (D), (E), and (F) until the M×N median filter has been applied to all M×N subgrids of the H×W grid; and
  H) assigning border values to the filtered H×W grid.

29. The method in claim 28, wherein:

processing is performed in a SIMD processor with at least V processing elements.

30. The method in claim 28, wherein:

loops have been unrolled and unnecessary sorting operations eliminated.

31. The method in claim 28 wherein step (E) comprises:

1) selecting a particular M×V subgrid of the (M+p)×V working grid,
2) fully sorting V columns of the particular M×V subgrid using the plurality of partially sorted columns of the (M+p)×V working grid to generate a set of V fully sorted columns,
3) selecting a row from the particular M×V subgrid as a selected row and a corresponding row from the history grid,
4) selecting an integer value Q from a set 0 to N−1,
5) loading into one of a set of N registers for the selected row a vector of elements consisting of the last Q elements of the corresponding row of the history grid and a first V−Q elements of the selected row of the set of V fully sorted columns, 6) partially sorting the set of N registers for the selected row, 7) repeating steps (3), (4), (5) and (6) for each of M rows of the particular M×V subgrid to produce a set of M×N registers of size V elements, 8) saving a last N−1 elements of the set of V fully sorted columns of the particular M×V subgrid in the history grid and setting a slope value (K) to one (1), 9) interpreting the set of M×N registers of size V elements as an M×N array of size V elements and selecting a set of all (K,1) diagonal lines with slope 1/K and at least two elements, and partially sorting corresponding elements in each diagonal line of elements in the set of all (K,1) diagonal lines, 10) repeating substep (9) as a diagonal loop selecting successive integers from 2 to (N−1)/2 as the slope value (K), resulting in V median values in a single register, and 11) storing the single register corresponding to the (M+p)×V subgrid into the filtered H×W grid.

32. A method of computing an M×N median filter on an H×W grid stored in a memory in a data processing system to produce a filtered H×W grid, wherein:

M is an odd integer,

N is an odd integer >3, p is a non-negative integer,

V is a positive integer >=N,

M<=N, and said method comprising:

A) selecting an (M+p)×W source subgrid of the H×W grid stored in the memory;

B) initializing a history grid;

C) selecting an (M+p)×V working grid of the (M+p)×W source subgrid, wherein: the (M+p)×V working grid has a plurality of columns;

D) partially sorting all of the plurality of columns of the (M+p)×V working grid to generate a plurality of partially sorted columns;

E) computing the M×N median filter on all M×N subgrids of the (M+p)×V working grid using the history grid to store a set of V values for an (M+p)×V subgrid into the filtered H×W grid corresponding to the (M+p)×V working grid and rewriting the history grid with a new set of values, comprising:

1) selecting a particular M×V subgrid of the (M+p)×V working grid, 2) fully sorting V columns of the particular M×V subgrid using the plurality of partially sorted columns of the (M+p)×V working grid to generate a set of V fully sorted columns, 3) selecting a row from the particular M×V subgrid as a selected row and a corresponding row from the history grid, 4) selecting an integer value Q from a set 0 to N−1, 5) loading into one of a set of N registers for the selected row a vector of elements consisting of the last Q elements of the corresponding row of the history grid and a first V−Q elements of the selected row of the set of V fully sorted columns, 6) partially sorting the set of N registers for the selected row, 7) repeating steps (3), (4), (5) and (6) for each of M rows of the particular M×V subgrid to produce a set of M×N registers of size V elements, 8) saving a last N−1 elements of the set of V fully sorted columns of the particular M×V subgrid in-the history grid and setting a slope value (K) to one (1), 9) interpreting the set of M×N registers of size V elements as an M×N array of size V elements and selecting a set of all (K,1) diagonal lines with slope 1/K and at least two elements, and partially sorting corresponding elements in each diagonal line of elements in the set of all (K,1) diagonal lines, 10) repeating substep (9) as a diagonal loop selecting successive integers from 2 to (N−1)/2 as the slope value (K), resulting in V median values in a single register, and 11) storing the single register corresponding to the (M+p)×V subgrid into the filtered H×W grid;

F) repeating steps (C), (D) and (E) until the M×N median filter has been applied to all M×N subgrids of the (M+p)×W source subgrid;

G) repeating steps (A), (B), (C), (D), (E), and (F) until the M×N median filter has been applied to all M×N subgrids of the H×W grid; and H) assigning border values to the filtered H×W grid.

33. The method in claim 32, wherein:

processing is performed in a SIMD processor with at least V processing elements.

34. The method in claim 32, wherein:

loops have been unrolled and unnecessary sorting operations eliminated.

* * * * *